United States Patent
Kim et al.

(10) Patent No.: US 7,635,144 B2
(45) Date of Patent: Dec. 22, 2009

(54) INFLATABLE TWO-LAYER FABRICS

(75) Inventors: Kwang-Oh Kim, Gyeongsangbuk-do (KR); Yang-Soo Park, Gyeongsangbuk-do (KR); Sang-Mok Lee, Gyeongsangbuk-do (KR)

(73) Assignee: Kolon Ind. Inc., Kwacheon (KR)

( * ) Notice: Subject to any disclaimer, the term of this patent is extended or adjusted under 35 U.S.C. 154(b) by 506 days.

(21) Appl. No.: 10/533,886

(22) PCT Filed: Nov. 6, 2003

(86) PCT No.: PCT/KR03/02370

§ 371 (c)(1),
(2), (4) Date: Aug. 7, 2006

(87) PCT Pub. No.: WO2004/042128

PCT Pub. Date: May 21, 2004

(65) Prior Publication Data

US 2006/0273557 A1 Dec. 7, 2006

(30) Foreign Application Priority Data

Nov. 6, 2002 (KR) ...................... 10-2002-0068309
Apr. 1, 2003 (KR) ...................... 10-2003-0020417

(51) Int. Cl.
*B60R 21/16* (2006.01)
(52) U.S. Cl. ................. 280/728.1; 139/383 R
(58) Field of Classification Search .............. 280/728.1; 139/383 R, 384 R, 387 R
See application file for complete search history.

(56) References Cited

U.S. PATENT DOCUMENTS

| 5,098,125 | A | 3/1992 | Thornton et al. |
| 5,989,660 | A * | 11/1999 | Moriwaki et al. .......... 428/35.2 |
| 6,220,309 | B1 | 4/2001 | Sollars, Jr. |
| 6,994,125 | B2 * | 2/2006 | Trondle et al. .............. 139/414 |
| 2001/0042980 | A1 | 11/2001 | Sollars, Jr. |

FOREIGN PATENT DOCUMENTS

| CN | 1376219 A | 10/2002 |
| JP | 6-16100 A | 1/1994 |
| JP | 7-300056 A | 11/1995 |
| JP | 2001-513154 A | 8/2001 |
| JP | 2002-120683 A | 4/2002 |
| JP | 2002-180351 A | 6/2002 |
| JP | 2002-321585 A | 11/2002 |
| KR | 2002-43729 A | 6/2002 |
| KR | 332581 B1 | 9/2002 |
| WO | WO-00/78577 A1 | 12/2000 |
| WO | WO-01/46502 A1 | 6/2001 |

* cited by examiner

*Primary Examiner*—Arti Singh-Pandey
(74) *Attorney, Agent, or Firm*—Birch, Stewart, Kolasch & Birch, LLP

(57) ABSTRACT

An inflatable two-layer fabric including two separated fabric layers, woven at the same time using a weaving machine, and an attachment area having a weaving pattern attaching the two fabric layers such that an air leakage per unit length (measured at 2.5 k Pa) of the attachment area is less than 0.8 L/min/cm.

19 Claims, 3 Drawing Sheets

(a)

(b)

(a)    (b)

A    C    B

INFLATABLE TWO-LAYER FABRICS

BACKGROUND OF THE INVENTION (a) Field of the Invention

The present invention relates to an inflatable two-layer fabric, more particularly to an inflatable two-layer fabric that can be used for car airbags or life jackets.

(b) Description of the Related Art

An inflatable fabric can be used for car airbags and life jackets. The inflatable fabric is especially useful for a side curtain airbag which is unfolded at the side windowpane to protect the passenger's head from being hurt by colliding with the windowpane or other structures. It is useful because the fabric should be at an inflated state for over 5 seconds if the car rolls over.

In general, methods for manufacturing inflatable fabrics for car airbags are classified into: 1) a method of sewing, fusing, or adhering two fabrics; and 2) a method of using a two-layer fabric wherein the two layers are partly crossed by an attachment point.

However, the first method requires additional sewing, fusing, or adhering procedures in addition to preparing two fabrics, resulting in complicated procedures and increasing manufacturing costs.

To solve this problem, the second method has been recently proposed.

An inflatable fabric has two separate fabric layers and an attachment point between said fabric layers. The fabric enclosed by the attachment point strongly interlocks the two layers when each single layer inflates rapidly, so that no air leaks out.

Methods to form an attachment point in said inflatable two-layer fabric has been proposed by U.S. Pat. Nos. 6,220,309, 5,098,125, 5,011,183, and 5,603,647.

U.S. Pat. No. 6,220,309 discloses a two-layer fabric whose separator area is formed of a plain weave and whose attachment area is formed of a 2/2 basket weave; U.S. Pat. Nos. 5,098,125 and 5,011,183 disclose a two-layer fabric whose separator area is formed of a plain weave and whose attachment area is formed of a 2/2 basket or 3/3 basket weave, a 1/2 twill or 1/3 twill weave, or a 5 harness satin; and U.S. Pat. No. 5,603,647 discloses a two-layer fabric whose separator area is formed of a plain weave, a basket weave, or a twill weave, and whose attachment area is formed of a 3/3 basket weave. Here, the separator area refers to the area in the two-layer fabric where the two fabric layers (upper layer and lower layer) are separated from each other, so that the two-layer fabric may inflate by air, etc. The attachment area refers to the area where the two separated fabric layers are attached to each other.

The above-mentioned two-layer fabrics mainly utilize attachment areas formed of a 3/3 basket weave or a 2/2 basket weave. However, if they are used alone, air may leak out at the attachment area when the two separated layers inflate.

SUMMARY OF THE INVENTION

Thus, an object of the present invention is to solve the problems described above and provide an inflatable two-layer fabric with an attachment area that is dense such that air leakage at the attachment area can be minimized when inflated, with all fabric layers formed of a plain weave so that air bags having a variety of forms can be made utilizing jacquard, and that are capable of being produced without a sewing process so that manufacture costs can be lowered significantly and that have good weaving properties and smoothness.

Another object of the present invention is to provide a car airbag comprising said inflatable two-layer fabric.

In order to attain the objects, the present invention provides an inflatable two-layer fabric comprising two separated fabric layers simultaneously woven by a weaving machine and an attachment point at the center of an attachment area where said two fabric layers are attached, said attachment area having air leakage per unit length (measured at 2.5 kPa using Antares' Leak Tester 900 Se) of less than 0.8 L/min/cm.

Said two-layer fabric comprises a separator area (A, B) composed of two separated fabric layers, and an attachment point (C) attaching said two separated fabric layers together.

Said separator area (A, B) is composed of two separated fabric layers formed of a plain weave. The left portion (A) and the right portion (B) of said separator area are mirror images of each other centered on said attachment point. Said attachment point (C) is formed of a plain weave by repetition of the left portion (A) and the right portion (B) of said separator area. Also, preferably, said two-layer fabric is coated with a synthetic resin.

The present invention further provides a car airbag comprising said inflatable two-layer fabric. Preferably, said airbag is a side curtain airbag for protecting vehicle passengers.

DETAILED DESCRIPTION OF THE PREFERRED EMBODIMENTS

Hereinafter, the present invention is described in more detail.

The present invention relates to an inflatable two-layer fabric capable of simplifying a manufacturing process and lowering a cost thereof for producing shock-absorbing products such as an airbag, that is capable of minimizing air leakage at an attachment area during inflation of a separator area and having good weaving properties and surface smoothness, and that is capable of being easily coated with a synthetic resin.

Figure 1:
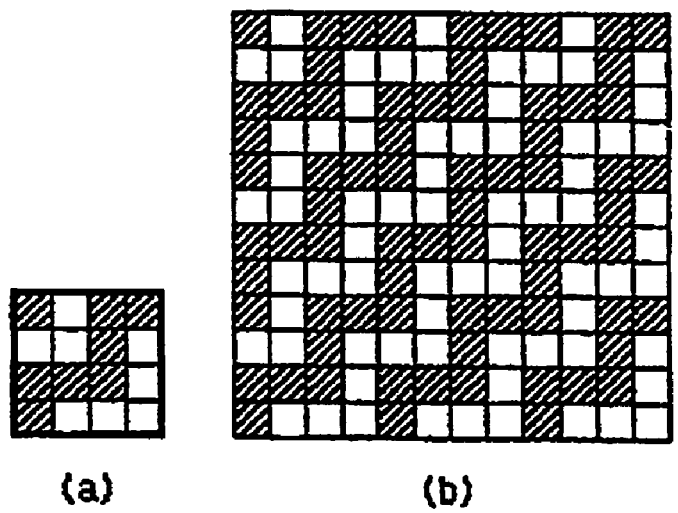
FIG. 1 shows weave diagrams illustrating the repeating pattern (a) of a two-layer fabric composed of two separated plain weave planes, and an extended pattern (b) thereof.

Now, referring to the attached drawings, the present invention will be described in more detail. FIG. 1 shows weave diagrams illustrating the repeating pattern (a) of a two-layer fabric composed of two separated plain weave planes and an extended pattern (b) thereof, and FIG. 2 is a cross-sectional view of the two-layer fabric of the present invention.

Figure 2:
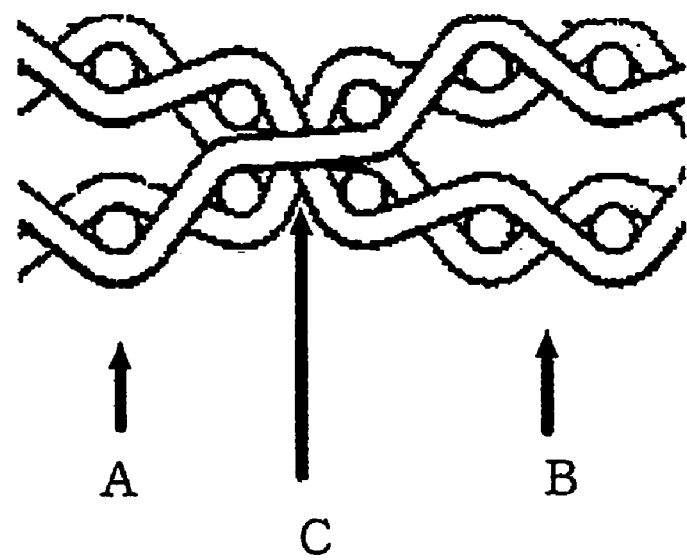
FIG. 2 is a cross-sectional view of the two-layer fabric of the present invention.

As seen in FIG. 2, the two-layer fabric of the present invention comprises a separator area (A, B) composed of two separated fabric layers, and an attachment area (C) attaching said two separated fabric layers together. The inflatable two-layer fabric of the present invention is prepared by weaving the two separated fabric layers (A and B of FIG. 2 and FIG. 4)

at the same time using a jacquard weaving machine, and forming mirror images of said two fabric layers centered at an attachment area (C).

The main object of said fabric layers of the present invention is to provide a fabric pocket to be inflated by air, etc. The attachment area isolates the pocket causing inflation of the pocket between the two separated fabric layers and withstands the pressure exerted when an inflating gas is channeled therein.

In the present invention, the attachment area (C) can refer to a point, line, or plane in the two separated fabric layers of the separator area (A, B) where the warp of the upper layer and the weft of the lower layer form a unitary weave, the weft of the upper layer and the warp of the lower layer form a unitary weave, the warp of the lower layer and the weft of the upper layer form a unitary weave, or the weft of the lower layer and the warp of the upper layer form a unitary weave, so that the two fabric layers make a single layer at the attachment area. Such a structure having an attachment is called an attachment structure. When the attachment structure is formed as a point, it is called an attachment point; when an attachment structure is formed as a line, it is called an attachment line; and when an attachment structure is formed as a plane, it is called an attachment plane. The attachment point, attachment line, and attachment plane are collectively called an attachment area. The weaving point refers to an area where the warp and the weft cross each other, so that a fabric can be formed.

Figure 4:
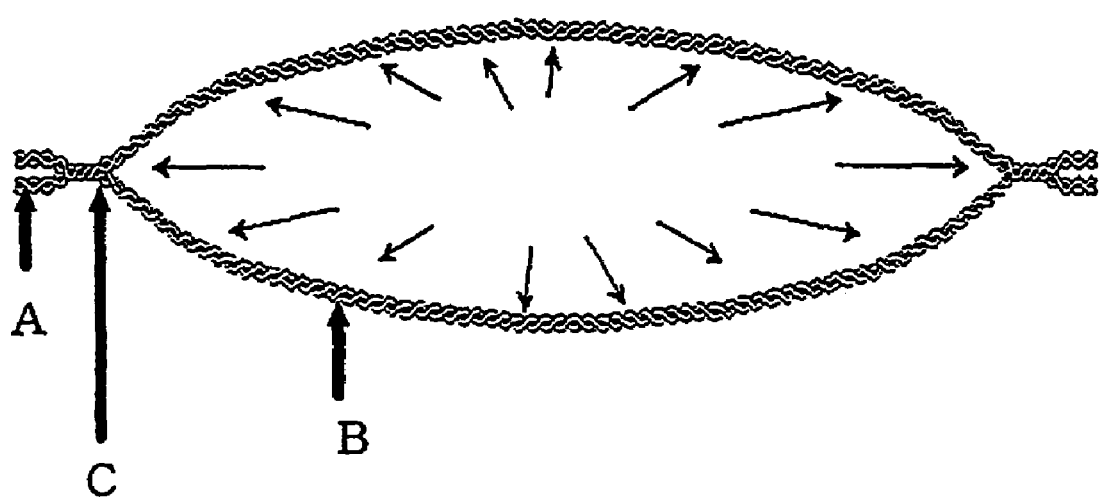
FIG. 4 is a cross-sectional view of an inflatable two-layer fabric according to one embodiment of the present invention, which has been inflated by air.

A fabric having a structure separated into an upper layer and a lower layer and an attachment structure can be divided into a separator structure (A, B of FIG. 2 and FIG. 4) and an attachment structure (C of FIG. 2 and FIG. 4). Also, it can be divided into the following three areas: an area enclosed by the separator structure (B of FIG. 4), or an inflating area; an attachment area (C of FIG. 2 and FIG. 4); and an area outside of the area enclosed by the attachment structure (A of FIG. 4), which is not relevant with respect to inflation.

Figure 3:
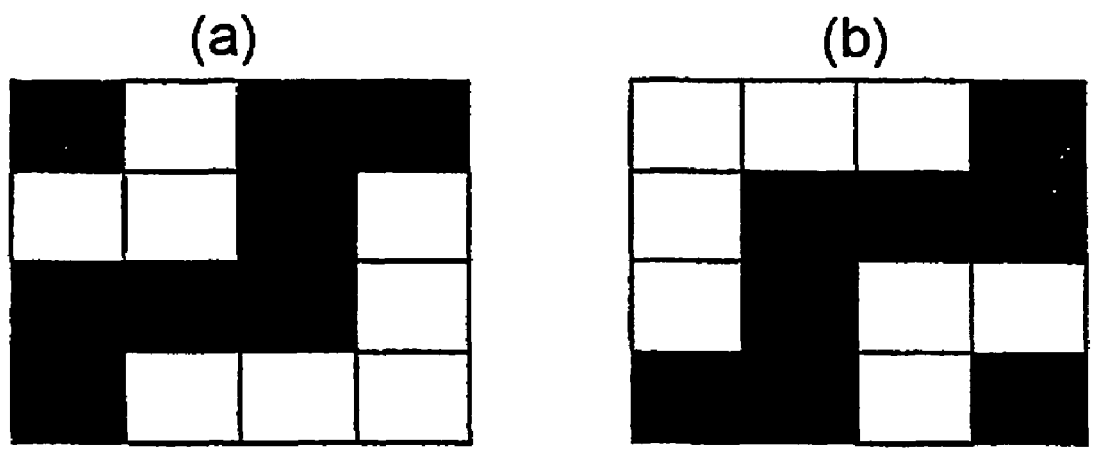
FIG. 3 shows weave diagrams illustrating the repeating patterns of the left portion (a) and the right portion (b) of the two-layer fabric shown in FIG. 2.

In FIG. 2, the left separator area (A) located at the left side of the attachment point and the right separator area (B) located at the right side of the attachment point are mirror images of each other, as shown in FIG. 3 and FIG. 4. In other words, said left separator area (A) is a complete repeating pattern as shown in FIG. 3(a), and said right separator area (B) is a mirror image of FIG. 3(a) and a complete repeating pattern as shown in FIG. 3(b). They cross each other at the attachment point (C).

In the present invention, the separator area (A, B) may be repeated two or more times to secure multiple attachment points. If so, the force generated during inflation is not concentrated on the first attachment point but is also transferred to the second or more attachment points so that the attachment line becomes stronger, and air leakage can be prevented.

Also, preferably, the inflatable two-layer fabric of the present invention is coated with a synthetic resin to reduce air leakage. For said synthetic resin, any synthetic resin used in fabric coating can be used. Preferably, a silicone coating is suitable in view of airtightness and strength.

The silicone resin coating is carried out to effectively fill up small spaces of the two-layer fabric, and it may be carried out on either side or both sides of the fabric. For the coating method, multi-step coating is preferred. If under-coating and top-coating are carried out by multi-step coating, the airtightness can be improved and the fabric becomes more flexible because the coating amount is decreased.

Preferably, the synthetic resin is coated in the range from 40 g/m² to 150 g/m². If the coating amount is less than 40 g/m², a lot of air leaks out of the airbag, and therefore the inflated state cannot be maintained for over 5 seconds. Otherwise, if the coating amount exceeds 150 g/m², the airbag becomes too thick and it may contact other structures during inflation.

In the two-layer fabric of the present invention, the separator layer has a double structure formed by a plain weave (FIG. 1), and the attachment structure is obtained by forming mirror images centering on the attachment area. Preferably, two or more attachment points may be formed to reduce air leakage.

To ensure airtightness of the two-layer fabric, it is very important to minimize extension of the fabric by offering tensile resistance against high-pressure air, etc. Therefore, the structure at the part where the two layers begin to separate from each other, or where the attachment begins, is a very important factor.

In the two-layer fabric of the present invention, this problem is solved by using a plain weave, which has high resistance against external tension in the fabric layer. Preferably, a high-density fabric having a cover factor defined by the following Equation 1 of over 1900 is used to offer good airtightness. If the cover factor is below 1900, air tends to leak out during inflation.

Cover factor (CF)=warp density (/inch)×SQRT (warp denier)+weft density(/inch)×SQRT (weft denier)   Equation 1

The two-layer fabric of the present invention has air leakage per unit length (measured at 2.5 kPa using Antares' Leak Tester 900 Se) at the attachment area of lower than 0.8 L/min/cm. If the air leakage per unit length attachment area exceeds 0.8 L/min/cm, the car airbag made of the fabric cannot protect passengers effectively.

Further, each fabric layer of the two-layer fabric of the present invention has a thickness measured by the ASTM D 1777 method of less than 0.5 mm, and stiffness value measured by the ASTM D 4032 circular band method of less than 3.5 kgf. If the thickness of each fabric layer exceeds 0.5 mm, it is not easy to set up the car airbag inside a vehicle. And, if the stiffness value exceeds 3.5 kgf, the car airbag may not inflate normally from the air pressure.

When an initial pressure of 50 kPa has been applied to an airbag, the inner pressure of the airbag should be at least 6 kPa after 5 seconds for it to function as a side curtain airbag. When a side curtain airbag inflates under high temperature and high pressure, the suture strength of the attachment area (C of FIG. 2) measured by the ASTM D 5822 method should be at least 80 kg/in to prevent tearing of the airbag. Further, in order to minimize air leakage at the attachment area during inflation and prevent melting of the fabric by heat, the breaking modulus should not exceed 60%. Particularly, because a side curtain airbag requires a relatively higher coating amount than general airbags, it should be able to maintain its strength for a long time even after the fabric has been worn by vibration of the car. To satisfy these conditions, the inflatable two-layer fabric of the present invention has at least 6 kPa of inner pressure after 5 seconds when gas having an initial pressure of 50 kPa has been applied, at least 80 kg/in of suture strength at the attachment area, a breaking modulus of less than 60%, and a strength maintenance ratio measured by the ASTM D 4157 method of at least 80%. If the strength maintenance ratio is less than 80%, the airbag may be torn during inflation.

The present invention further provides a side curtain airbag for vehicles comprising an inflatable two-layer fabric. The side curtain airbag of the present invention remains inflated for at least 5 seconds while the vehicle is rolling over.

As described above, the inflatable two-layer fabric of the present invention minimizes air leakage during inflation, so that it is useful for car airbags, life jackets, and other shock-absorbing products. In addition, since the two-layer fabric of the present invention requires no sewing, the manufacture process can be simplified, and thus the manufacture cost can be reduced.

Hereinafter, the present invention is described in more detail through Examples. However, the following Examples are only for the understanding of the present invention, and they are not to be construed as limiting the scope of the present invention.

EXAMPLES

Physical properties of the two-layer fabric of the present invention were measured as follows.

a) Air leakage per unit length (L/min/cm) at the attachment area:

The air leakage was measured with a measuring device equipped with an air pressure regulator, an airflow meter, and a pressure gauge. Air pressure at 2.5 kPa was injected into the separator area of the cut two-layer fabric, so that the two-layer fabric inflated completely. Then, volume (unit: L) of air leaking out of the two-layer fabric for a unit time (1 minute) was measured, and divided by the total attachment length (unit: cm) measured with a vernier calliper, a measuring tape, or a ruler to obtain the air leakage per unit length at the attachment area.

b) Cover factor: Calculated by the following Equation 1.

Cover factor (CF)=warp density (/inch)×SQRT (warp denier)+weft density (/inch)×SQRT (weft denier)    Equation 1 c) Stiffness: Measured by the ASTM D 4032 circular band method.

d) Thickness of single fabric layer: measured by the ASTM D 1777 method.

e) Suture strength: Measured by the ASTM D 5822 method.

f) Strength maintenance ratio: Measured by the ASTM D 4157 method.

Example 1

A plain-woven two-layer fabric (FIG. 2), wherein the separator area (A) on the left side of the attachment point (C) had a structure of FIG. 3(a); the separator area (B) on the right side of the attachment point (C) was a mirror image of the left separator area (A) and had a structure of FIG. 3(b); and the left separator area (A) and the right separator area (B) crossed each other at the attachment point (C), was prepared with a jacquard weaving machine using 426-denier polyamide multifilament as warp and weft. The warp density and weft density were 52/inch, and the cover factor was 2131. Then, silicone rubber was coated on both sides of the two-layer fabric by a two-step coating process (coating amount: 100 g/cm$^2$). The fabric was cut, and the air leakage per unit length at the attachment area, thickness of a single fabric layer, and stiffness value were measured. The air leakage per unit length at the attachment area was 0.6 L/min/cm, the stiffness value was 2.5 kgf, and the thickness of a single fabric layer was 0.4 mm.

Example 2

A plain-woven two-layer fabric (FIG. 2), wherein the separator area (A) on the left side of the attachment point (C) had a structure of FIG. 3(a); the separator area (B) on the right side of the attachment point (C) was a mirror image of the left separator area (A) and had a structure of FIG. 3(b); and the left separator area (A) and the right separator area (B) crossed each other at the attachment point (C), was prepared with a jacquard weaving machine using 315-denier polyamide multifilament as warp and weft. The warp density and weft density were 60/inch, and the cover factor was 2,129. An attachment line was enclosed by the plain-woven structure on the entire fabric. Outside of the enclosed attachment line, excluding the inflation pattern, a planar structure was formed. The planar structure is not necessarily an attachment structure.

Then, silicone rubber was coated on both sides of the two-layer fabric by a two-step coating process of under-coating and top-coating (coating amount: 100 g/cm$^2$), to stop air from leaking out of the attachment point, or the weaving point. The fabric was cut, and the air leakage per unit length at the attachment area, thickness of a single fabric layer, and stiffness value were measured. The air leakage per unit length at the attachment area was 0.7 L/min/cm, the stiffness value was 1.9 kgf, and the thickness of a single fabric layer was 0.39 mm.

Example 3

A two-layer fabric was prepared in the same manner as in Example 2, except that the silicone rubber coating amount was changed to 90 g/m$^2$.

The thickness of a single layer of the two-layer fabric measured by the ASTM D 1777 method was 0.39 mm. The stiffness value measured by the ASTM D 4032 circular band method was 1.9 kgf. An initial pressure of 50 kPa was applied to an airbag comprising the fabric, and the inner pressure of the airbag was measured 5 seconds later at 12.5 kPa. The suture strength of the attachment area (C of FIG. 2) measured by the ASTM D 5822 method was 119 kg/in, and the breaking modulus was 43%. And, the strength maintenance ratio measured by the coating fabric wear test according to the ASTM D 4157 method was 90%. To conclude, the side curtain airbag had good installation characteristics and inflatability.

Example 4

A two-layer fabric was prepared in the same manner as in Example 1 except that 420-denier nylon was used as warp and weft.

The thickness of a single layer of two-layer fabric measured by the ASTM D 1777 method was 0.4 mm. The stiffness value measured by the ASTM D 4032 circular band method was 2.5 kgf. An initial pressure of 50 kPa was applied to an airbag comprising the fabric, and the inner pressure of the airbag was measured 5 seconds later at 9.5 kPa. The suture strength of the attachment area (C of FIG. 2) measured by the ASTM D 5822 method was 123 kg/in, and the breaking modulus was 49%. And, the strength maintenance ratio measured by the coating fabric wear test according to the ASTM D 4157 method was 93%. To conclude, the side curtain airbag had good installation characteristics and inflatability. The inner pressure of the airbag was measured by the method shown in FIG. 5.

Figure 5:
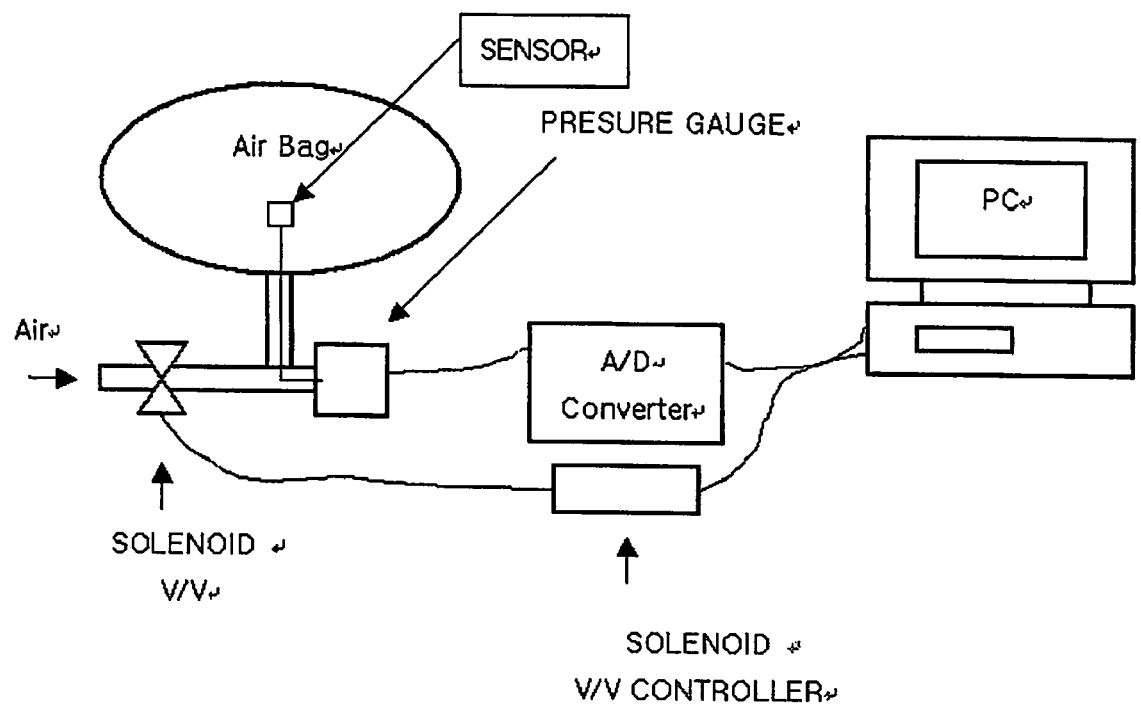
FIG. 5 shows the method of measuring the pressure inside an airbag.

As exemplified in FIG. 5, air was injected into an airbag, and the inner pressure rose. When the pressure reached a maximum, air injection was stopped and the inner pressure of the airbag was measured after 5.0 seconds. An electronic air injection controller was used to minimize operation error.

Comparative Example 1

A two-layer fabric, whose attachment area was formed by a 2/2 basket weave and separator area was formed by a plain weave, was prepared with a jacquard weaving machine using 426-denier polyamide multifilament as warp and weft. The warp density and weft density were 53/inch. Then, silicone rubber was coated on both sides of the two-layer fabric by a two-step coating process (coating amount: 100 g/cm$^2$). The fabric was cut, and the air leakage per unit length at the attachment area, thickness of a single fabric layer, and stiffness value were measured. The air leakage per unit length at the attachment area was 0.9 L/min/cm, the stiffness value was 3.6 kgf, and the thickness of a single fabric layer was 0.52 mm.

Comparative Example 2

A two-layer fabric was prepared in the same manner as in Example 4 except the warp density and weft density were changed to 46/inch, and the cover factor of a single fabric was 1880.

The prepared fabric was coated in the same manner as in Example 1. The thickness of a single fabric layer measured by the ASTM D 1777 method and the stiffness value measured by the ASTM D 4032 circular band method were favorable, being 0.38 mm and 1.9 kgf respectively. An initial pressure of 50 kPa was applied to an airbag comprising the fabric, and the inner pressure of the airbag was measured after 5 seconds to be 5.8 kPa. The suture strength at the attachment area (C of FIG. 2) measured by the ASTM D 5822 method was 109 kg/in, and the breaking modulus was 47%. Also, the strength maintenance ratio measured by the coating fabric wear test according to the ASTM D 4157 method was 90%, resulting in good installation characteristics. However, the inner pressure was too low, indicating that a lot of air leaked out of the airbag.

Comparative Example 3

The two-layer fabric prepared in the same manner as in Example 1 was coated by a one-step process (coating amount: 200 g/m$^2$). The air leakage per unit length measured at 2.5 kPa was 0.6 L/min/cm. Therefore, an airbag comprising the fabric has superior airtightness. However, because the fabric thickness measured by the ASTM D 1777 method was 0.52 mm, and the stiffness value measured by the ASTM D 4032 circular band method was 3.6 kgf, this fabric is insufficient in view of installation characteristics and inflatability for use as a side curtain airbag.

The inflatable two-layer fabric the present invention requires no sewing, and therefore the manufacturing process can be simplified, reducing the manufacturing cost. Also, since the attachment area is stiff, air leakage can be minimized. Further, it has superior weaving properties and good surface smoothness for synthetic resin coating. Therefore, it can be utilized for car airbags, life jackets, and other shock-absorbing products.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An inflatable two-layer fabric comprising:
    two separated fabric layers, woven at the same time using a weaving machine; and
    an attachment area having a weaving pattern attaching said two fabric layers such that an air leakage per unit length (measured at 2.5 k Pa) of the attachment area is less than 0.8 L/min/cm.

2. The inflatable two-layer fabric according to claim 1, further comprising:
    a separator area including said two separated fabric layers; and
    an attachment point attaching said two separated fabric layers,
    wherein a left separator area and a right separator area of said separator area, located at left and right sides of said attachment point respectively, are mirror images of each other, and said attachment area includes a plain weave which is formed by repeated weaving of the left separator area and the right separator area.

3. The inflatable two-layer fabric according to claim 1, wherein the inflatable two-layer fabric has a stiffness value equal to or smaller than 3.5 kgf.

4. The inflatable two-layer fabric according to claim 1, wherein each single fabric layer of said two-layer fabric has a thickness equal to or smaller than 0.5 mm.

5. The inflatable two-layer fabric according to claim 1, wherein each single fabric layer of said two-layer fabric has a cover factor, defined by the following Equation 1, that is equal to or larger than 1900:

Cover factor (CF)=warp density (/inch)×SQRT (warp denier)+weft density (finch)×SQRT (weft denier)   Equation 1.

6. The inflatable two-layer fabric according to claim 1, further comprising:
    an inner pressure 5 seconds after an initial pressure of 50 kPa has been applied that is equal to or larger than 6 kPa, a suture strength at the attachment area equal to or larger than 80 kg/in, a breaking modulus smaller than 60%, and a wear strength maintenance ratio equal to or larger than 80%.

7. The inflatable two-layer fabric according to claim 2, wherein said attachment point is repeated two or more times.

8. The inflatable two-layer fabric according to claim 1, further comprising a synthetic resin coating.

9. The inflatable two-layer fabric according to claim 8, wherein an amount of coating on one side of said two-layer fabric ranges from 40 g/m$^2$ to 150 g/m$^2$.

10. A car airbag comprising: an inflatable two-layer fabric including two separated fabric layers, woven at the same time using a weaving machine, and an attachment area having a weaving pattern attaching said two fabric layers, such that an air leakage per unit length (measured at 2.5 k Pa) of the attachment area is less than 0.8 L/min/cm.

11. The car airbag according to claim 10, which is a side curtain airbag for vehicles.

12. The car airbag according to claim 10, further comprising:
    a separator area including said two separated fabric layers; and
    an attachment point attaching said two separated fabric layers,
    wherein a left separator area and a right separator area of said separator area, located at left and right sides of said attachment point respectively, are mirror images of each other, and said attachment area includes a plain weave which is formed by repeated weaving of the left separator area and the right separator area.

13. The car airbag according to claim 10, wherein the inflatable two-layer fabric has a stiffness value equal to or smaller than 3.5 kgf.

14. The car airbag according to claim 10, wherein each single fabric layer of said two-layer fabric has a thickness equal to or smaller than 0.5 mm.

15. The car airbag according to claim 10, wherein each single fabric layer of said two-layer fabric has a cover factor, defined by the following Equation 1, that is equal to or larger than 1900:

$$\text{Cover factor (CF)} = \text{warp density (/inch)} \times \text{SQRT (warp denier)} \text{ weft density (finch)} \times \text{SQRT (weft denier)} \quad \text{Equation 1.}$$

16. The car airbag according to claim 10, further comprising:
an inner pressure 5 seconds after an initial pressure of 50 kPa has been applied that is equal to or larger than 6 kPa, a suture strength at the attachment area equal to or larger than 80 kg/in, a breaking modulus smaller than 60%, and a wear strength maintenance ratio equal to or larger than 80%.

17. The car airbag according to claim 10, wherein said attachment point is repeated two or more times.

18. The car airbag according to claim 10, further comprising a synthetic resin coating.

19. The car airbag according to claim 18, wherein an amount of coating on one side of said two-layer fabric ranges from 40 g/m$^2$ to 150 g/m$^2$.

* * * * *